United States Patent [19]

Baum et al.

[11] Patent Number: 5,029,368
[45] Date of Patent: Jul. 9, 1991

[54] RELEASE MECHANISM

[75] Inventors: Robert A. Baum, Bradenton; Steven H. Samimi, Pinellas Park, both of Fla.

[73] Assignee: Conax Florida Corporation, St. Petersburg, Fla.

[21] Appl. No.: 495,474

[22] Filed: Mar. 19, 1990

[51] Int. Cl.⁵ .............................................. B64D 17/30
[52] U.S. Cl. ....................................... 24/602; 24/603; 244/151 B; 294/82.25; 294/82.29
[58] Field of Search .................. 297/468; 24/602, 603, 24/633, 645, 647, 643; 244/151 A, 151 B; 294/82.25, 82.29

[56] References Cited

U.S. PATENT DOCUMENTS

| | | | |
|---|---|---|---|
| 3,183,568 | 5/1965 | Gaylord | 24/645 |
| 4,023,846 | 5/1977 | Poehlmann | 24/602 X |
| 4,307,858 | 12/1981 | Naab et al. | 24/602 X |

Primary Examiner—James R. Brittain
Attorney, Agent, or Firm—Hodgson, Russ, Andrews, Woods & Goodyear

[57] ABSTRACT

A mechanism for releasing one member from another. A piston is disposed partially in the bore of one member and partially in the bore of the other member to bridge the gap therebetween for maintaining attachment thereof. The piston is responsive to a propulsive force for movement forwardly to a second position wherein all of the piston is disposed in the other member. The other member bore has a reduced-diameter portion forward of and adjoining an increased-diameter rearward portion thereby providing a shoulder. The piston has a forward portion and a rearward portion having substantially the same diameters as the forward and rearward bore portions respectively of the other member. A tapered portion connects the piston forward and rearward portions and is impelled on the shoulder when the piston is moved to the second position. A circumferential groove is provided in the surface of the tapered portion to capture the shoulder whereby a tapered segment forward of the groove acts as a fish-hook to prevent re-bound of the piston.

20 Claims, 4 Drawing Sheets

RELEASE MECHANISM

The present invention relates generally to release mechanisms such as for canopies or parachutes.

When a parachutist lands in the water, it is essential that he divest himself of the parachute or canopy as quickly as possible. There are fundamentally two reasons for this. The first is that, if there are surface winds, the parachutist can be dragged along the surface of the water which can cause severe distress and possibly drowning. The second reason is that the parachute or canopy is heavier than water and, when filled with water, will then to drag, the parachutist below the surface of the water. This situation can be accelerated if there are underwater currents which catch parachute on descent into the water. While there should normally be no difficulty for the parachutist to release the canopy, the parachutist may sometimes not be able to do so due to unconsciousness or injury. Therefore, it is desirable that an automatic mechanism be provided for causing the canopies to be released. Various criteria have been developed in the design of such devices and there are certain desirable characteristics that such a device should have. For example, in order that the canopy not release automatically as the parachutist descends through a rain cloud, a sensing mechanism may be provided which is only activated by current-carrying water such as salt water.

It is also desirable that the sleeve about which the riser strap is disposed be able to withstand very high loads during normal operation to prevent inadvertent pullout of the sleeve but which is quickly releasable when a sensing mechanism senses that the device is in salt water. U.S. Pat. No. 4,307,858 to Carlton W. Naab and Roman Jankowiak, which is commonly assigned with the present invention and which is incorporated herein by reference, discloses a canopy release mechanism wherein a sleeve, about which a riser strap is disposed, is positioned between first and second spaced apart portions of a yoke, the sleeve having a bore extending throughout its length, and the spaced apart portions of the yoke being provided with first and second apertures respectively alignable with the bore. A piston bridges the gap between one end of the sleeve and the first portion of the yoke, the piston having portions disposed within the bore of the sleeve and the first aperture in the yoke. A cylindrical bushing or plug spans the gap between the other end of the sleeve and the second portion of the yoke. An explosive device is positioned so that, when exploded, it drives the piston so that it is positioned entirely within the sleeve, the movement of the piston in turn forcing the cylindrical plug or bushing so that it is positioned entirely within the second aperture of the second spaced apart portion of the yoke.

The action of the piston due to the explosiveness of the propulsive charge is very rapid, and any rebound of the piston and/or bushing would accordingly be very rapid, i.e., the movements and any rebound may be described as instantaneous. If the piston and/or bushing are allowed to rebound, the yoke and sleeve may become reconnected before the sleeve is able to drop free of the yoke and release the canopy from its load. It is a feature of the aforesaid patent that rebound preventing means are provided in both the sleeve and the second aligned aperture. Thus, the cylindrical bushing is caused to wedge within the second aligned aperture, and the sleeve bore is provided with a shoulder upon which a tapered portion of the piston can wedge. If the piston is effectively prevented from rebound, its length is such that its position also restrains the bushing against rebound.

In the release mechanism of the aforesaid patent, the piston is wedged on the shoulder such that typically 8 to 10 pounds of force may be required before rebound occurs. While rebound is not believed to be a problem in such release mechanisms, it is considered desirable to provide an improved release mechanism which has a greater margin of safety, i.e., a more positive wedging of the piston on the shoulder so that a much larger force of perhaps 400 to 500 pounds is required for rebound. This may instill greater confidence in such a release mechanism.

It is therefore an object of the present invention to provide an improved margin of safety against piston rebound in a release mechanism such as that of the aforesaid patent.

In order to achieve the above object, in accordance with the present invention the tapered portion of the piston, which wedges onto the bore shoulder, is provided with a circumferential groove in its tapered surface. The part of the tapered portion forward of the groove may be described as a "fish-hook" wherein the force of movement of the piston as it becoms wedged on the shoulder may result in capture of a portion of the shoulder in the groove back of the "fish-hook" which prevents backward movement of the piston to thus provide a more positive wedging of the piston on the shoulder for greater confidence and reliability.

The foregoing and other objects, features, and advantages of the present invention will become more apparent from the following detailed description taken in conjunction with the accompanying drawings in which a preferred embodiment of this invention is illustrated.

DETAILED DESCRIPTION OF THE PREFERRED EMBODIMENT

Figure 1:
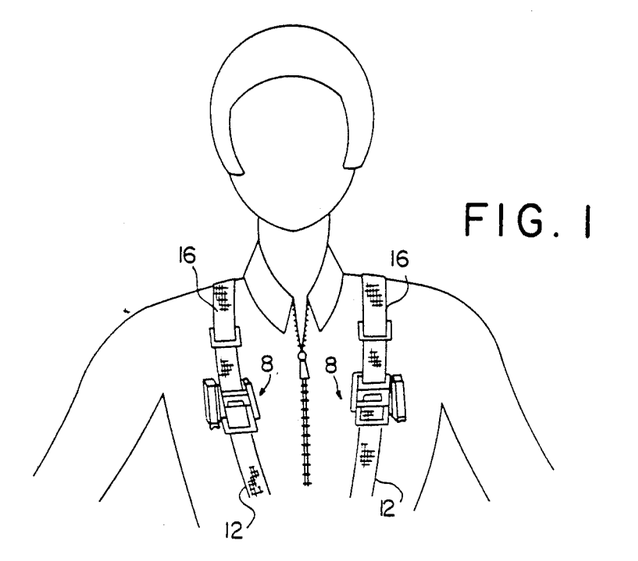
FIG. 1 illustrates a parachutist and the manner in which the canopy release mechanism of the present is worn.
Figure 2:
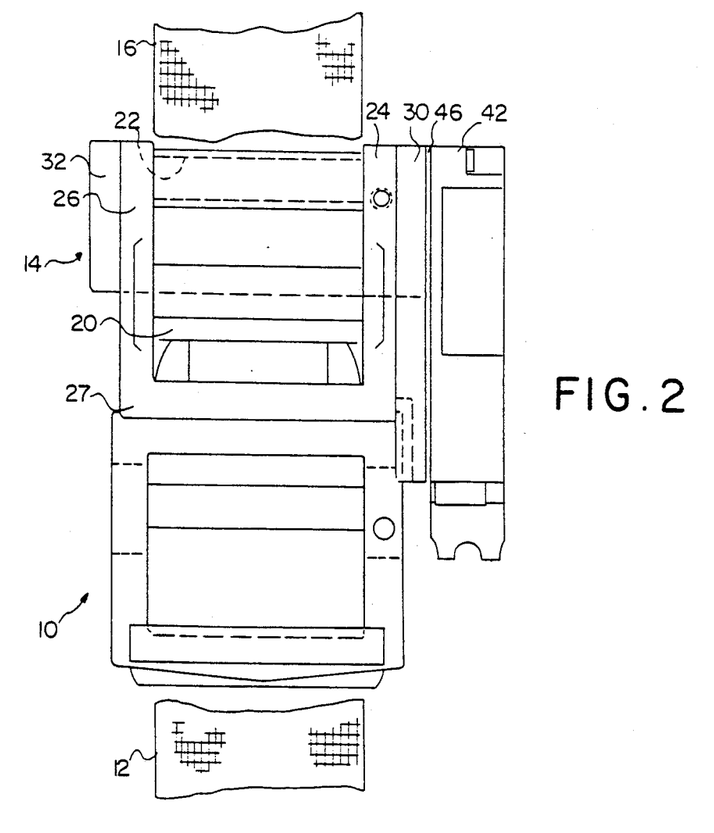
FIG. 2 is an enlarged detail view of the canopy release mechanism shown in FIG. 1.

The present invention may be used with a canopy release mechanism of the type shown in U.S. Pat. No. 3,183,568 the disclosure of which is incorporated herein by reference thereto. Referring to the drawings, such a release mechanism is illustrated generally at 8 and comprises two subassemblies. The lower subassembly, illustrated generally at 10, has a body harness 12 secured to it, and the upper subassembly, illustrated generally at 14, has a riser strap 16 secured to it. The parts are shown in FIG. 1 before parachute deployment. As shown in the aforementioned patent, the lower subassembly 10 is provided with two upwardly extending male prongs which are received within suitable apertures in the upper subassembly for releasable securement thereto. The upper subassembly or canopy release fitting is provided with a safety locking bar 18 pivoted at spaced apart corners, the flap being provided with flanges (not shown) which overlie a handle 20. The handle 20 is in turn connected to a cross shaft (not shown) of suitable cross section, the cross shaft and handle when in one position being capable of receiving the male projections of the lower subassembly 10, and when in another position, such as that illustrated in FIGS. 2 and 4, being capable of locking the lower subassembly 10 in its assembled position. The locking bar 18 is provided to prevent inadvertent rotation of the handle 20 which inadvertent rotation could possible cause the parts to become disassembled. As taught by U.S. Pat. No. 4,307,858 the disclosure of which is incorporated herein by reference thereto, the riser strap 16 may be disposed about a sleeve 22. The sleeve 22 is disposed between first and second portions or arms 24 and 26 of a yoke 25 of the canopy release fitting 14, the yoke also including a bight portion 27. Each of the arms 24 and 26 is provided with a fitting, described in greater detail hereinafter, which has a respective aperture 37 and 41 alignable with the bore 39 within the sleeve 22.

Figure 3:
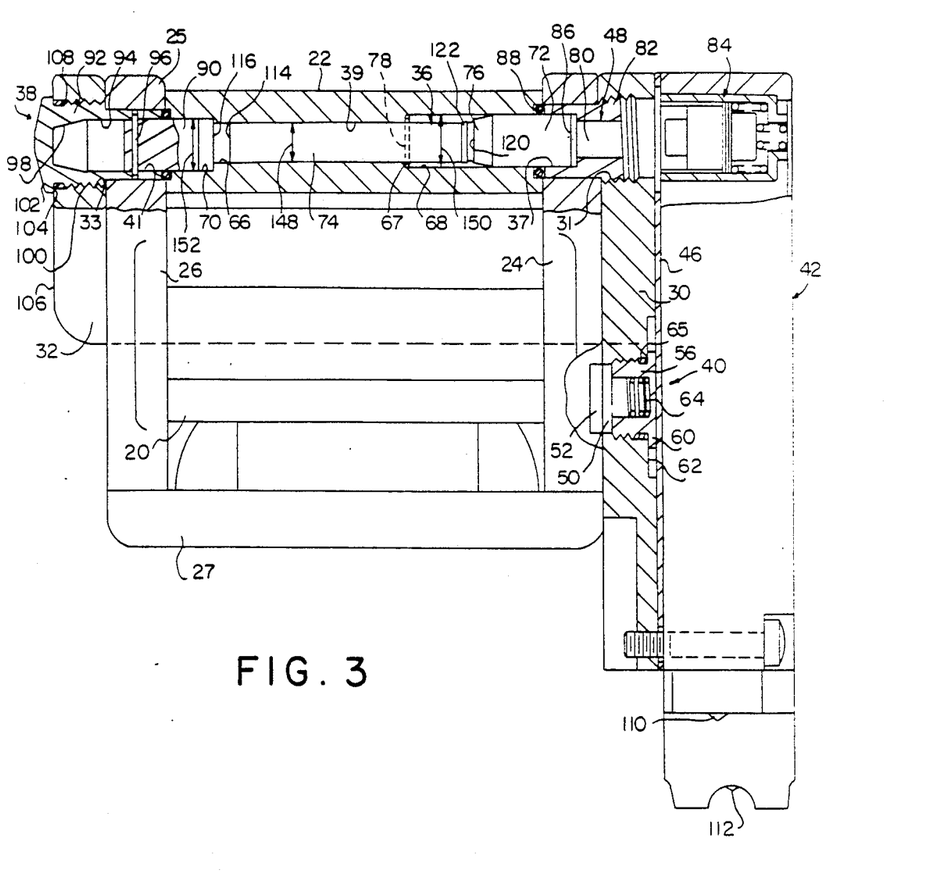
FIG. 3 is a further enlarged view of a portion of the canopy release mechanism shown in FIG. 2, portions being shown in section.
Figure 4:
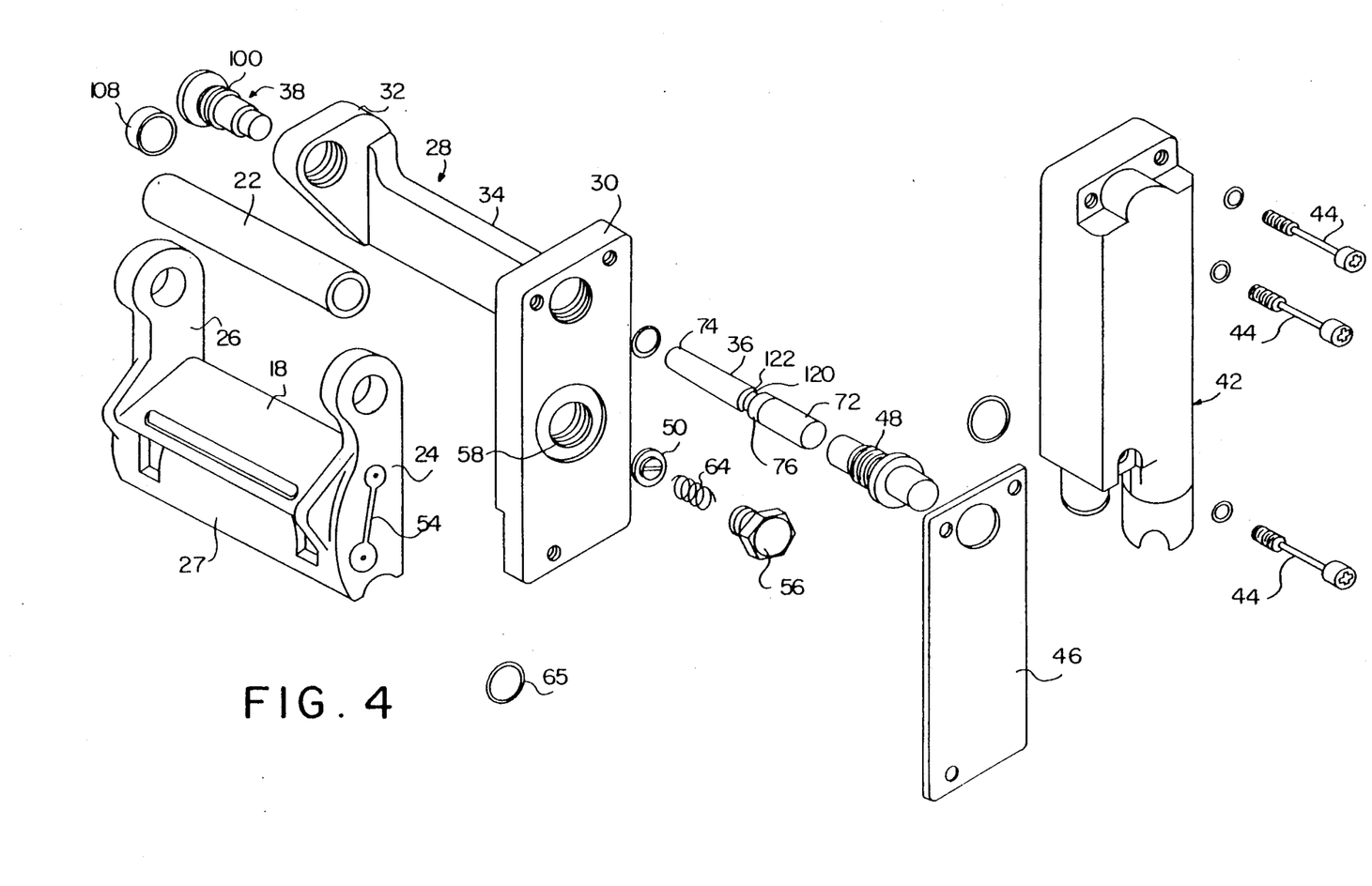
FIG. 4 is an exploded perspective view of the release mechanism shown in FIG. 3.

Referring to FIG. 4, there is also provided an adapter plate 28, which is a U-shaped yoke, when viewed in transverse section, having spaced apart first and second portions or arms 30 and 32 respectively interconnected by a bight portion 34. The first arm 30 is adapted to lie alongside of the yoke first arm 24, and the second arm 32 is adapted to lie alongside the yoke second arm 26. The portions 30 and 32 are provided with suitable threaded apertures 31 and 33 respectively, illustrated in FIG. 3, which are alignable with yoke and sleeve apertures 37, 39, and 41, illustrated in FIG. 3. A piston 36 and a release plug assembly, illustrated generally at 38, pass through the respectively adjacent apertures 37 and 41 respectively into respective ends of the sleeve bore 39 to hold the parts in their assembled relationships.

Anti-rotation means, illustrated generally at 40 in FIG. 3, are provided to prevent the canopy release fitting from rotating relative to the adapter plate 28. The anti-rotation means, the piston, and the release plug assembly will be described in greater detail hereinafter. A sensor assembly, illustrated generally at 42, is held adjacent the adapter plate first arm 30 by suitable fasteners 44 with a suitable gasket 46 disposed between the sensor assembly 42 and the adapter plate first arm 30. Propulsion means in the form of a cartridge assembly 48 is mounted within the sensor assembly 42 in position for supplying propulsive force to the piston 36.

The anti-rotation means 40, as best shown in FIGS. 3 and 4, includes a locking disc 50 which is provided with a rib 52 receivable in slot 54 in the yoke first arm 24. A locking disc plug 56 is threaded into aperture 58 in the adapter plate first arm 30, the plug 56 being provided with a flange 60 which lies against the recessed flat 62 to limit the inward positioning of the plug 56. A spring 64 is disposed within the plug 56 and bears against the locking disc 50. The anti-rotation means 40 also includes an O-ring 65 for sealing. When the various parts are assembled together, the rib 52 will be received within slot 54 and will serve to prevent the canopy releasing fitting 14 from rotating about the axis of the piston 36 and the release plug assembly 38.

As best shown in FIG. 3, the sleeve bore 39 extends the full length of the sleeve 22. The bore 39 is stepped so that an intermediate or second portion 66 is of reduced diameter, illustrated at 148, from the diameters, illustrated at 150 and 152 respectively, of the first and third full- or enlarged-diameter portions 68 and 70 which full-diameter portions extend from the intermediate portion 66 to the respective ends of the sleeve 22. When the diameter of the bore portion or bore means is referred to herein or in the claims, it is meant to refer to the diameter of the bore. The piston 36 has an enlarged-diameter first portion 72 aft of a reduced-diameter second portion 74, the two portions being interconnected by a tapered portion 76. The diameters of the first and second portions 72 and 74 are substantially equal to the diameters of the full-diameter bore first portion 68 and the reduced-diameter bore second portion 66 respectively of sleeve bore 39, i.e., they are so dimensioned with respect to the bores 68 and 66 respectively that the piston 36 closely fits slidably within the sleeve 22. When the piston 36 is initially assembled into the sleeve 22, it is provided with a shear pin 78 which is adapted to be disposed adjacent the shoulder 67 defining the position where the bores 66 and 68 adjoin, i.e., the exposed ends of the shear pin 78 either touching or spaced slightly from the shoulder 67. Referring to FIG. 3, there is a void within the sleeve 22, which void is defined as bounded by tapered portion 76, the enlarged-diameter bore portion 68, the shoulder 67, and the reduced cross section portion 74 of the piston 36. In order to create an environmental seal, a sealant material such as, for example, a room temperature vulcanizing material, is disposed between the enlarged-diameter piston portion 72 and the enlarged-diameter bore portion 68. The enlarged first portion 72 of the piston 36 bridges the gap between the yoke first arm 24 and the associated end of the sleeve 22. Thus, if the piston 36 were moved so that it was no longer received within the bore 37, then at least the right-hand end of the sleeve 22 would be free to move vertically relative to the yoke first arm 24. The propulsion means 48 is provided to effect movement forwardly of the piston so that it is disposed out of the bore 37. The propulsion means 48 includes a suitable explosive charge 80 carried by a threaded member 82 which is adapted to threadedly engage threaded aperture 31 within the adapter plate first arm 30. As shown in FIG. 3, the threaded member 82 defines or contains the bore or aperture 37 which receives the enlarged end 72 of the piston 36 disposed adjacent to the explosive charge 80. Suitable contact means, illustrated generally at 84, are provided to fire the explosive charge, the contact means in turn receiving an electrical signal from sensor assembly 42 when the sensing element detects the presence of salt water or other conductive fluids. A suitable propulsion means and sensor assembly can be selected using principles commonly known to one of ordinary skill in the art to which this invention pertains. As is commonly known to one of ordinary skill in the art to which this invention pertains, a washer 86, composed of a suitable material such as Teflon synthetic resin polymer, is disposed between the explosive charge and the piston end to prevent undue blowby of the explosive gases. A sealing O-ring 88 is disposed within a suitable annular recess between threaded member 82 and the adjacent end of the sleeve 22.

The release plug assembly 38 is provided to releasably connect the yoke second arm 26 to the sleeve 22. The release plug assembly 38 includes a first supporting element 92 which has threads 100 for threadedly engaging aperture 33 of the adapter plate second portion 32. Supporting element 92 is provided with a cavity 94 which includes bore 41 and in which a cylindrical plug 90 is received. The release plug assembly 38 further includes retaining means in the form of a shear pin 96 for, prior to firing of explosive 80, retaining the cylindrical plug 90 partly in the yoke second arm bore 41 and partly in the sleeve bore enlarged portion 70. As can be seen in FIG. 3, the cavity 94 within the supporting element 92 is closed at its forward end and includes, in addition to the cylindrical bore 41, means capable of capturing the cylindrical plug 90 when it is moved toward the closed end to prevent the rebound of the plug 90, the means to capture the plug 90 being a tapered cavity portion 98. As shown in FIG. 3, the cavity 94, which extends within the supporting element 92 slightly beyond the yoke second arm 26, is longer than the cylindrical plug 90. In addition, the cavity 94 and the plug 90 are so sized, with respect to one another, that the plug 90 is slidable within the cavity 94 without cocking. When the parts are in the normal position, prior to firing, as shown in FIG. 3, there is a void between the closed end of the supporting element 92 and the plug 90. In order to prevent this void from becoming filled with a liquid, such as water, when the parts are initially assembled a sealing compound such as, for example, a room temperature vulcanizing material, is applied between the interfitting parts.

In order to ensure that the element 92 is threaded into the aperture 33 a suitable amount, the element 92 is provided with a head 102 having a stop surface 104 which is adapted to contact a corresponding surface 106 on the adapter plate second arm 32 to limit the distance which the element 92 can be threadedly received in the aperture. A seal in the form of an O-ring 108 is provided between the threads 100 and the stop surface 104.

If a parachutist enters salt water when the parts are assembled in the position illustrated in FIG. 3, the sensor contacts 110 and 112 will detect the presence of the salt water and cause a capacitor (not shown) to be discharged to ignite the explosive charge 80. When this happens, the piston 36 will be rapidly propelled by the explosive force forwardly or to the left as indicated in FIG. 3 until the entire length of the enlarged-diameter portion 72 of the piston is disposed within the enlarged-diameter portion 68 of the sleeve bore. The explosive charge 80 is selected in accordance with principles commonly known to those of ordinary skill in the art to which this invention pertains to desirably provide an explosive force such that this movement of the piston is so rapid that it may be said to be instantaneous. As the piston 36 begins its movement to the left, the ends of the shear pin 78 are sheared. As the piston is propelled away from the yoke first portion or arm 24, its leading end surface 114 will contact the exposed surface 116 of the plug 90 and transfer to the plug 90 a substantial portion of its energy of momentum. This will cause the plug 90 to shear the pin 96 and then move the left through the cavity 94 to be wedged in the cavity tapered portion 98 which thereby captures the plug 90 and prevents its rebound. The plug 90 will enter the cavity tapered portion 98 and be disposed entirely within the supporting element 92 and will no longer bridge the gap between the sleeve 22 and the yoke second arm 26. In the meantime, the tapered portion 76 of the piston will engage the shoulder 67 to be impelled thereon, as will be discussed in greater detail hereinafter, with neither end of the piston extending beyond the ends of the sleeve, the dimensions of the bore and piston being selected in accordance with principles commonly known to those of ordinary skill in the art to which this invention pertains to achieve this result. In addition, the broken off ends of the shear pin 78 may wedge along the piston tapered portion 76 in such a manner that they may tend to embed themselves into the surface and thus additionally prevent rebound of the piston 36. As soon as the piston 36 has moved to the left to a position where it no longer bridges the gap between the right-hand end of the sleeve 22 and the yoke first arm 24 and as soon as the plug 90 has moved to the left-hand position where it no longer bridges the gap between the left-hand end of the sleeve 22 and the yoke second arm 26, the sleeve 22 about which the riser strap is disposed may move away from the position illustrated in FIG. 3 thereby freeing the riser strap.

Figure 5:
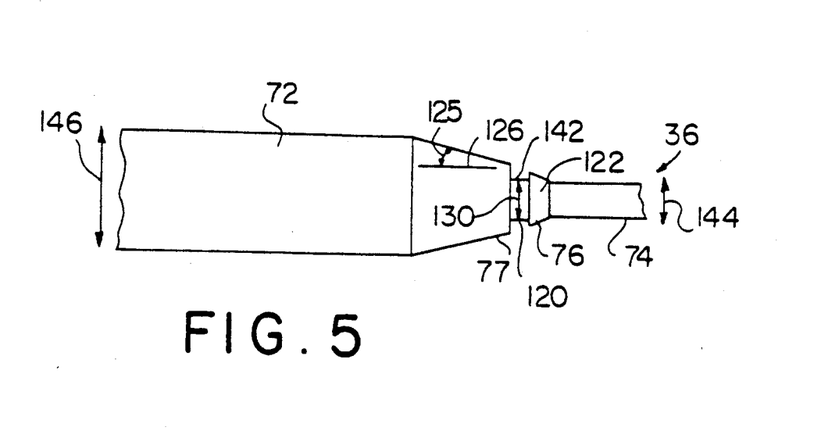
FIG. 5 is an enlarged view of a portion of the piston of the release mechanism shown in FIG. 3.
Figure 6:
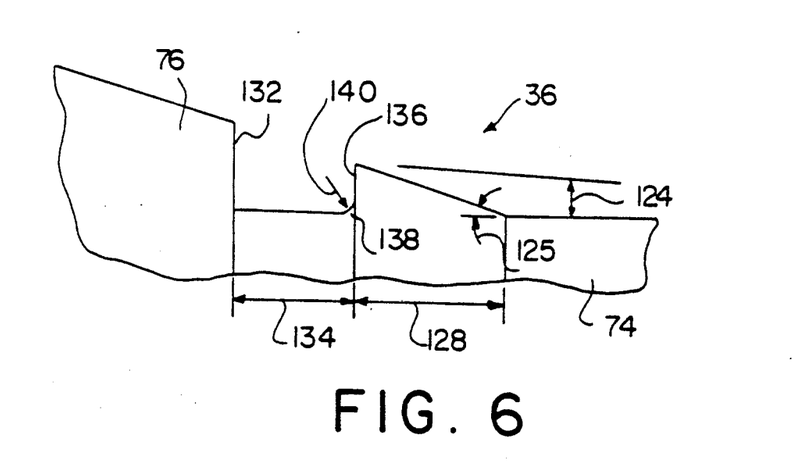
FIG. 6 is an enlarged partial view of the tapered portion of the piston of the release mechanism shown in FIG. 3.

While the force of impact of the piston tapered portion 76 of, for example, the release mechanism of the aforesaid '858 patent as it is rapidly propelled against the shoulder 67 thereof may normally cause it to wedge on the shoulder sufficiently that a normally adequate force of perhaps 8 to 10 pounds is required to cause it to rebound and thereby undesirably reconnect to the sleeve and yoke before they have been able to separate, it is desirable to provide an improved margin of safety against such rebound for a higher confidence factor in the release mechanism. Referring to FIGS. 5 and 6, in order to provide a more positive engagement between the piston tapered portion 76 and the shoulder 67, illustrated in FIG. 3, so that a much greater force of perhaps 400 to 500 pounds is required for rebound for a greater margin of safety, in accordance with the present invention a circumferential groove 120 is provided in the surface 77 of the piston tapered portion 76 for capturing a portion of the shoulder 67 (FIG. 3), as will be described hereinafter, wherein a segment 122 of the piston tapered portion which is forward of the groove 120 may be called a "fish-hook" portion.

The sleeve 22 is composed of a material which is softer or more ductile than the material of piston 36. For example, the piston 36 may be composed of H900 17-4PH stainless steel, while the sleeve 22 may be composed of H925 or H950 17-4PH stainless steel, H900, H925, and H950 referring to the annealing temperature in degrees Fahrenheit after hardening treatment. These types of steel and the method of making them are commonly known to those of ordinary skill in the art to which this invention pertains.

The groove 120 is positioned in the piston tapered portion 76 so that, for a piston wherein the reduced-diameter portion 74 has a diameter, illustrated at 144, of perhaps 0.2+ or −0.001 inch and the enlarged-diameter portion 72 has a diameter, illustrated at 146, of perhaps 0.25 inch whereby the reduced-diameter bore portion 66 has a diameter of about 0.2 inch. The difference, illustrated at 124, between the fish-hook radius at its maximum diameter and the radius of the reduced-diameter piston portion 74 is perhaps 0.005+ or −0.0005 inch. In other words, the fish-hook portion 122 tapers rearwardly to a diameter which is perhaps 0.01+ or −0.001 inch greater than that of portion 74. With the piston tapered portion 76 as well as the fish-hook portion 122 being tapered at an angle, illustrated at 125, relative to a line 126 parallel to the piston axis, i.e., axial direction, of perhaps 10 degrees, the fish-hook portion extends over a distance, illustrated at 128, between the reduced-diameter portion 74 and the groove 120 of perhaps 0.03 inch. The depth of the groove 120 may be such that the diameter, illustrated at 130, of the piston 36 at the groove is perhaps 0.2+ or −0.0002 inch, i.e., substantially the same diameter as the diameter of the reduced-diameter piston portion 74. The axial length, illustrated at 134, of the groove 120 may be perhaps 0.02 to 0.025 inch. As a result, it should be noted that the rear wall 132 of the groove extends radially outwardly beyond the forward wall 136, i.e., radially outward beyond the portion of the fish-hook portion having the greatest diameter.

While it is not positively known what happens when the piston tapered portion 76 is rapidly propelled by the explosive force of the explosive charge 80, it is believed that the following may occur. The material of the sleeve 22 being softer than that of the piston 36 and having nowhere else to which to be displaced when the shoulder 67 is struck by the fish-hook portion 122, it is forced backwards forming a edge toward the direction the piston 36 is moving from. After a movement of perhaps 0.05 inch of the piston tapered portion 76 into the material of the shoulder 67 at which time the shoulder material edge is rearwardly of the fish-hook portion 122 but disposed radially at substantially the height of the forward groove wall 136, the rear groove wall 132, which is higher radially than the forward groove wall 136, abruptly slams into the metal edge of the shoulder 67 forcing it into the groove 120 since there is nowhere else for the metal to go. With a portion of the shoulder 67 displaced into the groove 120, the fish-hook portion 122 may be said to act as a fish-hook to prevent re-bound of the piston 36 so that a positive and increased margin of safety against piston re-bound may be provided for increased confidence and reliability.

The corner between the forward wall 136 and bottom 142 of the groove 120 is preferably rounded slightly, i.e., the groove forward wall 136 is radiused at the bottom. This fillet radius portion 138 has a radius, illustrated at 140, of perhaps 0.005+ or −0.002 inch to prevent-shear and thereby provide increased strength to the fish-hook portion 122 at the forward groove wall 136 for penetrating the shoulder 67.

It should be understood that while the invention has been described in detail herein, the invention can be embodied otherwise without departing from the principles thereof, and such other embodiments are meant to come within the scope of the present invention as defined by the appended claims.

What is claimed is:

1. Apparatus comprising a first member having a bore means, a second member having a bore means, a piston disposed in a first position wherein said piston is partially in said first member bore means and partially in said second member bore means for maintaining attachment of said first member to said second member, propulsion means for propelling said piston to a second position wherein said piston is disposed in said second member bore means and out of said first member bore means for releasing said first member from said second member, said second member bore means having first and second bore portions, said second member bore means first portion being between said first member bore means and said second member bore means second portion and having a diameter which is greater than the diameter of said second member bore means second portion, said first and second portions of said second member bore means being in adjoining end-to-end relationship to define a shoulder, said piston having a first portion, a second portion, and a tapered portion having a tapered circumferential surface between said first and second piston portions, said second piston portion extending from said tapered portion into said second portion of said second member bore means, said piston first portion having a diameter which is greater than the diameter of said second portion of said second member bore means whereby said tapered portion may be impelled onto said shoulder when said piston is propelled to said second position by said propulsion means, and circumferential groove means in said tapered surface for engaging said shoulder for preventing re-bound of said piston from said second position toward said first position.

2. Apparatus comprising a first member having a bore means, a second member having a bore means and composed of metal, a piston composed of metal and disposed in a first position wherein said piston is partially in said first member bore means and partially in said second member bore means for maintaining attachment of said first member to said second member, propulsion means for propelling said piston to a second position wherein said piston is disposed in said second member bore means and out of said first member bore means for releasing said first member from said second member, said second member bore means having first and second bore portions, said second member bore means first portion being between said first member bore means and said second member bore means second portion and having a diameter which is greater than the diameter of said second member bore means second portion, said first and second portions of said second member bore means being in adjoining end-to-end relationship to define a shoulder, said piston having a first portion, a second portion, and a tapered portion having a tapered circumferential surface between said first and second piston portions, said piston second portion extending from said tapered portion into and having a diameter which is substantially equal to the diameter of said second portion of said second member bore means, said piston first portion having a diameter which is greater than the diameter of said second portion of said second member bore means and which is substantially equal to the diameter of said first portion of said second member bore means whereby said tapered portion may be impelled onto said shoulder when said piston is propelled to said second position by said propulsion means, the metal of said second member being more ductile than the metal of said piston, circumferential groove means in said tapered surface defining a tapered segment extending over a distance axially of about 0.03 inch between said groove means and said piston second portion, said tapered segment having a diameter which is about 0.01 inch greater than the diameter of said second member bore means second portion whereby said shoulder may engage said groove means preventing movement toward said first position by said tapered segment so that re-bound of said piston may be prevented.

3. Apparatus according to claim 2 wherein said groove means includes a bottom surface and further includes a side surface which defines a wall of said tapered segment, the apparatus further comprising means defining a fillet radius at the corner of said bottom surface and said side surface for strengthening said tapered segment.

4. Apparatus according to claim 3 wherein said fillet radius means has a radius which is equal to about 0.005 inch.

5. Apparatus according to claim 4 wherein the diameter of said piston second portion is equal to about 0.2 inch and said groove means bottom surface extends over a distance axially of about 0.02 inch and the diameter of which is about 0.2 inch.

6. Apparatus according to claim 2 wherein the diameter of said piston second portion is equal to about 0.2 inch and said groove means has a bottom surface which extends over a distance axially of about 0.02 inch and the diameter of which is about 0.2 inch.

7. Apparatus according to claim 6 wherein said tapered portion tapers at an angle of about 10 degrees relative to the axial direction of the piston, and the diameter of said piston first portion is equal to about 0.25 inch.

8. Apparatus according to claim 2 wherein the diameter of said piston second portion is equal to about 0.2 inch and each of said piston and said second member is composed of stainless steel 9. Apparatus according to claim 2 wherein said piston is composed of 71-4 PH stainless steel the annealing temperature of which is about 900 degrees Fahrenheit and said second member is composed of 17-4 PH stainless steel the annealing temperature of which is in the range of about 925 to 950 degress Fahrenheit.

10. Apparatus comprising a yoke having spaced apart first and second portions each of which has a bore means therein, a sleeve extending between said first and second portions and having a bore means therein which is in alignment with said bore means of said first and second yoke portions, a piston disposed in a first position wherein said piston is disposed partially in said sleeve bore means and partially in said yoke first portion bore means to bridge the gap between said sleeve and said yoke first portion for maintaining the sleeve in attachement to the yoke first portion, propulsion means for propelling said piston to a second position wherein said piston is disposed in said sleeve bore means and out of said yoke first portion bore means whereby the sleeve is separable from the yoke first portion, plug means disposed in a first position partially in said sleeve bore means and partially in said yoke second portion bore means to bridge the gap between said sleeve and said yoke second portion for maintaining the sleeve in attachment to the yoke second portion, said plug means responsive to propelling of said piston to said second position for movement to a second position wherein said plug means is disposed in said yoke second portion bore means and out of said sleeve bore means whereby the sleeve is separable from the yoke second portion, said piston having a first portion having a diameter, a second portion having a diameter which is less than said piston first portion diameter, and a tapered portion having a tapered circumferential surface between said first and second piston portions, said piston second portion extending toward said plug means from said tapered portion, said sleeve bore means having a first portion and having a second portion which extends toward said plug means from said sleeve bore means first portion and which has a diameter which is less than the diameter of said sleeve bore means first portion, said first and second portions of said sleeve bore means being in adjoining end-to-end relationship to define a shoulder, said sleeve bore means second portion diameter being substantially equal to said piston second portion diameter, said piston first portion diameter being greater than said sleeve bore means second portion diameter whereby said tapered portion may be impelled on said shoulder when said piston is propelled to said piston second position by said propulsion means, and circumferential groove means in said tapered surface for receivingly engaging said shoulder for preventing movement of said piston from said piston second position toward said piston first position.

11. Apparatus according to claim 10 wherein each of said piston and said sleeve is composed of metal, the metal of which said sleeve is composed being more ductile than the metal of which said piston is composed, said groove means in said tapered surface defining a tapered segment extending over a distance of about 0.03 inch between said groove means and said piston second portion, said tapered segment having a diameter which is about 0.01 inch greater than the diameter of said piston second portion and which is greater than the diameter of said sleeve bore means second portion.

12. Apparatus according to claim 1 wherein said groove means includes a bottom surface and further includes a side surface which defines a wall of said tapered segment, the apparatus further comprising means defining a fillet radius portion at the corner of said bottom surface and said side surface for strengthening said tapered segment.

13. Apparatus according to claim 12 wherein said fillet radius portion has a radius which is equal to about 0.005 inch.

14. Apparatus according to claim 13 wherein the diameter of said piston second portion is equal to about 0.2 inch and said groove means has a bottom surface which extends axially over a distance of about 0.02 inch and the diameter of which is about 0.2 inch.

15. Apparatus according to claim 11 wherein the diameter of said piston second portion is equal to about 0.2 inch and said groove means has a bottom surface which extends over a distance axially of about 0.02 inch and the diameter of which is about 0.2 inch.

16. Apparatus according to claim 10 wherein the apparatus is a canopy release mechanism.

17. Apparatus according to claim 10 wherein said piston is composed of 71-4 PH stainless steel the annealing temperature of which is about 900 degress Fahrenheit and said sleeve is composed of 17-4 PH stainless steel the annealing temperature of which is in the range of about 925 to 950 degress Fahrenheit.

18. Apparatus according to claim 17 wherein said groove means in said tapered surface defines a tapered segment extending over a distance of about 0.03 inch between said groove means and said piston second portion, said tapered segment having a diameter which is about 0.01 inch greater than the diameter of said piston second portion and which is greater than the diameter of said sleeve bore means second portion.

19. Apparatus according to claim 18 wherein said groove means includes a bottom surface and further includes a side surface which defines a wall of said tapered segment, the apparatus further comprising means defining a fillet radius portion at the corner of said bottom surface and said side surface for strengthening said tapered segment.

20. Apparatus according to claim 19 wherein said fillet radius portion has a radius which is equal to about 0.005 inch.

* * * * *

UNITED STATES PATENT AND TRADEMARK OFFICE
CERTIFICATE OF CORRECTION

PATENT NO. : 5,029,368
DATED : July 9, 1991
INVENTOR(S) : Robert A. Baum and Steven H. Samimi It is certified that error appears in the above-identified patent and that said Letters Patent is hereby corrected as shown below:

COLUMN 10;

Claim 12, line 21, change "1" to --11--.

Signed and Sealed this

Tenth Day of November, 1992

Attest:

DOUGLAS B. COMER

*Attesting Officer*    Acting Commissioner of Patents and Trademarks